GARMENT DISPLAY RACK
Original Filed April 11, 1952 2 Sheets-Sheet 1
Fig. 1.
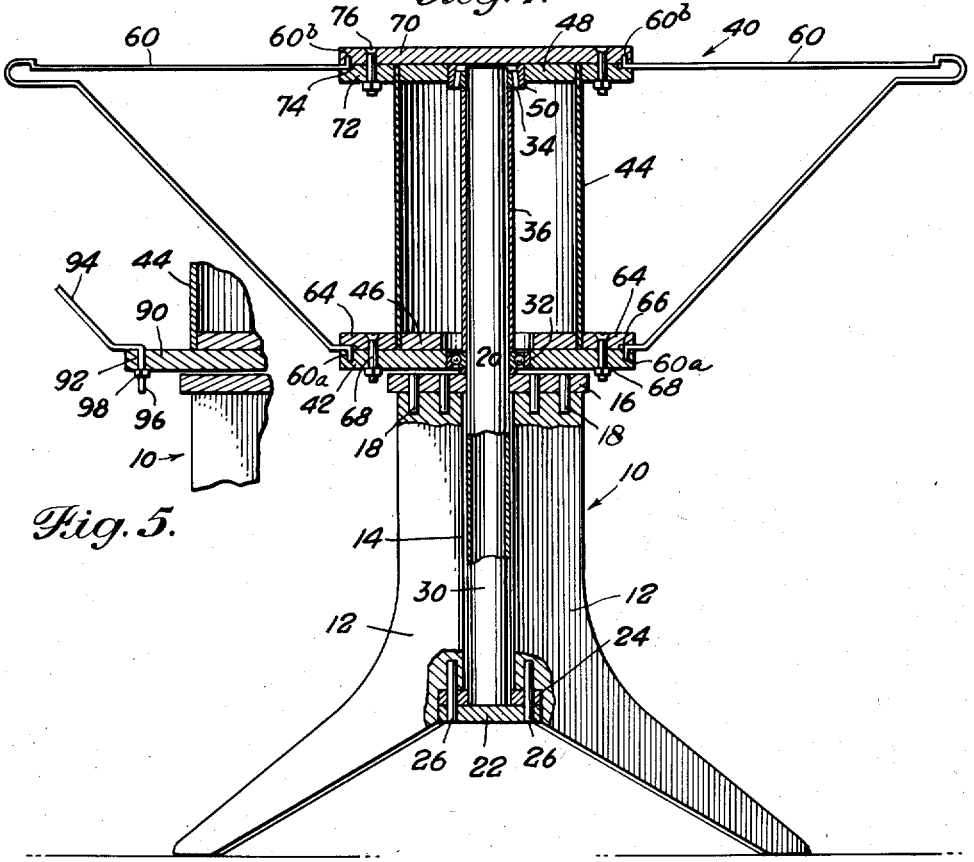
Fig. 5.
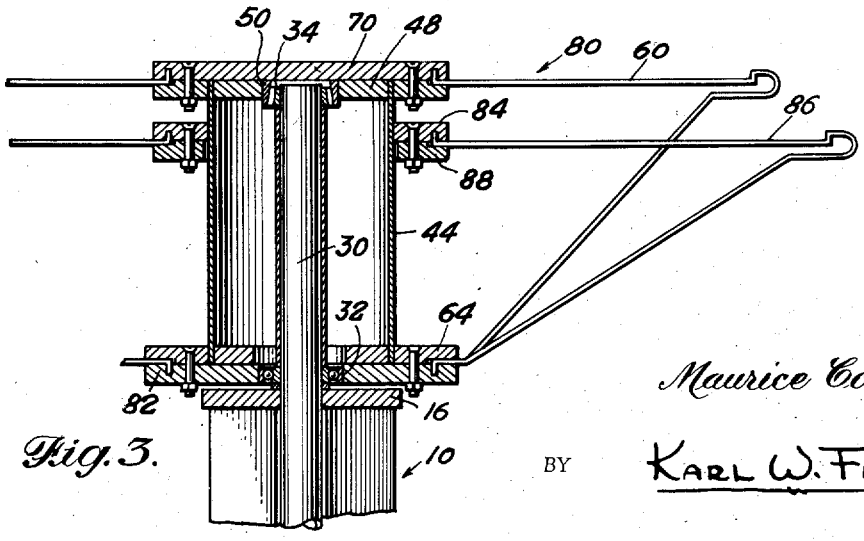
Fig. 3.
INVENTOR
Maurice Cohen,
BY Karl W. Flocks
ATTORNEY Feb. 11, 1958 M. COHEN Re. 24,427

GARMENT DISPLAY RACK

Original Filed April 11, 1952 2 Sheets-Sheet 2

INVENTOR

Maurice Cohen,

BY

KARL W. FLOCKS

ATTORNEY

United States Patent Office

Re. 24,427
Reissued Feb. 11, 1958

24,427

GARMENT DISPLAY RACK

Maurice Cohen, Miami, Fla.

Original No. 2,701,646, dated February 8, 1955, Serial No. 281,773, April 11, 1952. Application for reissue January 28, 1957, Serial No. 639,595

4 Claims. (Cl. 211—165)

Matter enclosed in heavy brackets [ ] appears in the original patent but forms no part of this reissue specification; matter printed in italics indicates the additions made by reissue.

The present invention relates to a garment display rack. More particularly, the present invention relates to a rotatable garment display rack which is adapted to display garments and the like to their best advantage.

Prior to the instant invention, the heretofore known garment display racks have generally been constructed having a rectangular configuration. However, rectangular racks have the disadvantage of materially reducing valuable floor space and, moreover, are cumbersome and usually very unattractive.

Although circular racks have been employed in the past for display purposes, none of the heretofore known circular display racks have been constructed to withstand heavy loads. Moreover, the heretofore known circular racks generally were not rotatable and, furthermore, were not constructed with the idea in mind of accenting the appearance of the surrounding furnishings.

The trend to modern furnishing, in recent years, has made it evident that the retail store of today not only requires that garment display racks be structurally suitable to carry heavy loads of merchandise but, in addition, the racks must be attractive and pleasing in appearance and adaptable to modern surroundings.

It is one of the objects of the present invention to provide a garment display rack of the rotary type that is capable of withstanding heavy loads.

Another object of the present invention is to provide a rotary garment rack that is arranged to display merchandise to its best advantage.

Still another object of the present invention is to provide a rotary garment display rack which includes a minimum number of structural elements that are easily fabricated and assembled.

Still another object of the present invention is to provide a rotary garment display rack that has great rigidity and stability and thereby adapted to withstand heavy loads.

Still another object of the present invention is to provide a rotatable garment display rack that is attractive and pleasing in appearance and thereby adapted to be utilized with modern appurtenances.

Other objects and the nature and advantages of the instant invention will be apparent from the following description taken in conjunction with the accompanying drawings, wherein:

Fig. 1 is a vertical sectional view of one form of the garment display rack;

Fig. 3 is a partial vertical sectional view of a modified form of the invention;

Fig. 5 is a detail in section of a modification of a hanger locking means; and

Figure 2:
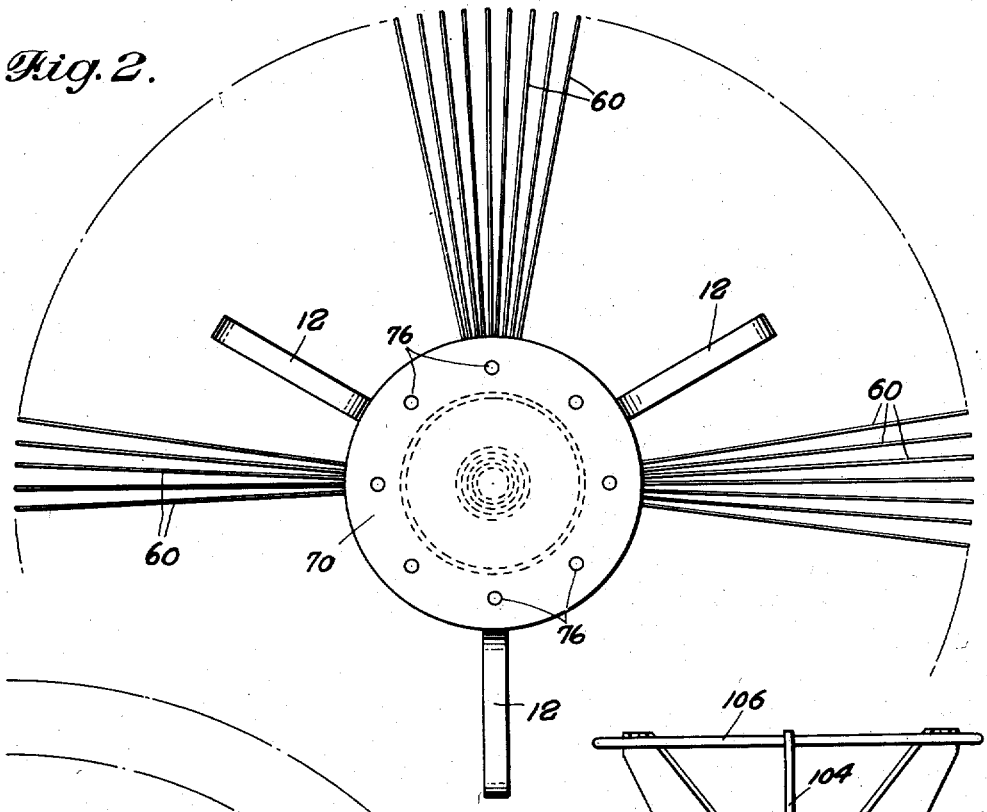
Fig. 2 is a plan view of the rack shown in Fig. 1.

Referring to the drawings, and particularly Figs. 1 and 2, one form of the invention is illustrated comprising a base assembly generally indicated at 10. The base assembly includes a triangular arrangement of legs or supporting members 12 each of which is formed with a foot and a body portion. As shown in Fig. 1, the foot portions of the members 12 extend outwardly and provide a stable and rigid base for the rack unit. The body portions of the members 12 extend vertically and define therebetween an opening 14. The members 12 are firmly and securely locked together by an upper locking plate 16 which abuts against the top portion of each member and is secured thereto by dowels 18. The upper locking plate 16 has formed therein an opening 20 which is adapted to be concentric with the opening 14 defined by the supporting members 12. The supporting members 12 are further secured in place by a lower locking plate 22 and an inner lower locking washer 24. The locking plate 22 and washer 24 are secured to the supporting members 12 by dowels which fit flush against the plate 22, thereby providing a neat and pleasing effect. The base assembly is completed by a shaft 30 which extends through the opening 14 defined by the supporting members 12 and is firmly held in place by the locking plate 16, the lower locking washer 24 and the lower locking plate 22, against which the shaft abuts. Referring again to Fig. 1, the shaft 30 is shown extending upwardly and through the opening 20 in the upper locking plate 16. The upper portion of the shaft 30 carries a ball bearing unit 32 and a thrust bearing unit 34, the purpose of which will be hereinafter described. A spacer sleeve 36 encircles the shaft 30 and is positioned between the bearing units 32 and 34, thereby holding the bearing units in place.

A hanger assembly generally indicated at 40 is adapted to be positioned on the shaft 30 and rotates thereon as a unit. The hanger assembly includes a bottom disc member 42 which is formed to receive the ball bearing unit 32 and thereby rotate with respect to the shaft 30. A hollow drum 44, which includes an apertured lower plate 46, is secured to the disc member 42 by suitable means, such as a glue joint, and is enclosed at its topmost end by a plate 48 which includes a bearing cup 50 adapted to receive the bearing unit 34.

The hanger assembly 40 further includes a series of hangers 60 upon which the garments to be displayed are conveniently draped. The bottom disc member 42 is provided with a plurality of small holes near the outside edge of the upper face thereof, the small holes adapted to receive the bottom-most portion or prong 60a of each hanger 60. The hanger units 60 are locked into position in the bottom disc member 42 by a lower locking ring 64, which slidably fits around the drum 44. The lower locking ring 64 has a cutout portion 66 in the lower face thereof which provides access for the hangers 60. A plurality of bolts 68 extend through convenient openings in the lower locking ring 64 and the bottom disc member 42, and are secured therein by suitable nuts, thereby locking the hanger prongs 60a in the bottom disc member 42.

The upper hanger portions, upon which the garments to be displayed are draped, are secured to a top disc member 70 in a manner similar to the lower hanger portion locking means. The disc member 70, which, in effect, is the top of the rack, is secured to the [drum 44] *plate 48* by suitable means, preferably a glue joint. A plurality of small holes is formed in the disc member 70 near the outside of the lower face thereof and the holes are adapted to receive a series of prongs 60b formed as part of the upper portion of the hangers 60. An upper locking ring 72 slidably fitting around the drum 44, has a cut-out portion 74 which provides access to the upper portion of the hangers 60. The locking ring 72 is firmly secured to the disc member 70 by bolts 76 which extend through openings in the disc 70 and ring 72, thereby locking prongs 60b in the disc 70. The drum 44 is constructed such that it is able to withstand the large torsional and compressive loads present when the hangers 60 are pivoted with the garments displayed thereon. Thus, when the hangers 60 are pivotally moved in the same direction so that the horizontally extending upper portions are no longer radial to the shaft axis, and define less than a right angle with a line tangent to the disc 70, then a torsional load inversely proportional to this angle and directly proportional to the weight of the garments supported by the hangers is produced between the upper disc 70 and lower plate 42. This torsional load is absorbed by the drum 44, thereby preventing the rack from tipping under load and allowing complete freedom of movement of the hangers individually or collectively and, furthermore, providing for the unimpeded rotation of the hanger assembly 40.

*The drum 44 is able to absorb the total torsional load due to the transmission of the loads thereto through the interaction of the lower disc member 42 and the lower plate 46 and the interaction of the top disc member 70 and lower plate 48. It is seen that the absorption of the torsional loads by the drum 44 prevents relative motion between the top disc member 70 and lower disc member 42, whereby the prongs 60a and 60b of the hangers 60 are maintained in vertical alignment, thereby preventing failure of the hanger assembly 40 under heavy loads.*

*As seen in Fig. 1, the diameter of drum 44 which defines structural means is more than one-half the diameter of the upper and lower discs. The drum 44 is thus adapted to absorb the large compressive and torsional stresses created when the hanger assembly, fully loaded with garments, is rotated, or when the individual garment hangers are pivotally moved during the display of trousers positioned thereon.*

It is apparent that the hangers 60 are secured in the hanger assembly 40 in a manner such that they cannot be loosened, fall off, or sag, due to excessive loads or undue handling. Moreover, the hangers 60 may be pivoted on the prongs 60a, 60b, thereby providing for flexibility of movement and convenience in positioning or inspecting the garments placed on the rack. Since the hangers 60, carried by the hanger assembly 40, are rotatable about the stationary shaft 30, the garments carried by the hangers 60 may be displayed to their full advantage. Furthermore, a maximum number of people may inspect the garments displayed without inconveniencing or crowding one another.

The entire hanger assembly 40, including the drum 44, lower and upper discs 42 and 70, locking rings 64 and 72, and the hangers 60, may be lifted as a unit from engagement with the shaft 30, if repairs need be made, or if the rack is to be stored or shipped by freight in cartons, or if another unit, an example of which will be described hereinafter, is substituted for the hanger assembly 40.

Figure 4:
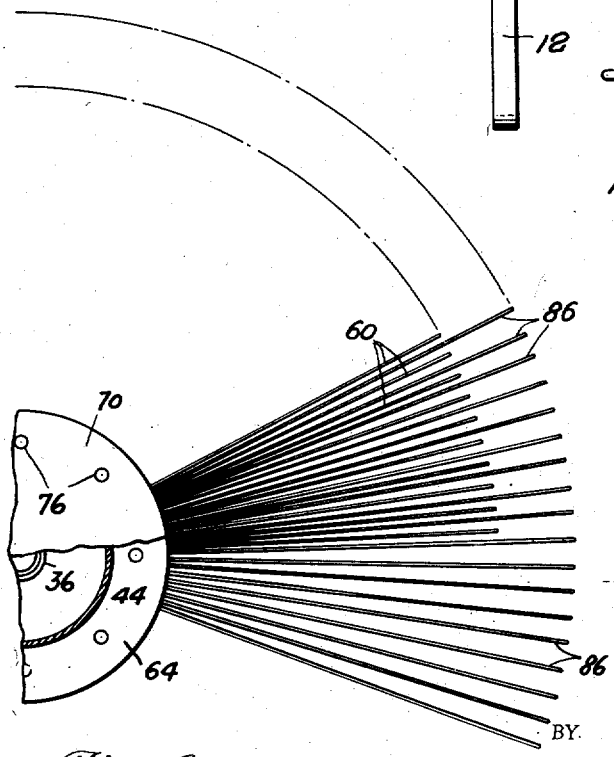
Fig. 4 is a plan view of the rack shown in Fig. 3 with sections broken away.

Referring now to Figs. 3 and 4, a modified form of hanger assembly is illustrated wherein a greater number of hangers is employed. The modified hanger assembly, generally indicated at 80, is adapted to be placed as a unit on the stationary shaft 30 which, as described above, forms parts of the base assembly 10. The hanger assembly 80 includes a bottom disc member 82 which engages the bearing unit 32 and which has secured thereto the drum 44. The drum 44 includes the bearing cup 50 which receives the shaft bearing unit 34. The upper disc 70 abuts against *and by suitable means is secured to* the top plate 48 of the drum 44 and serves as the top of the rack. A series of hangers 60 are pivotally secured in the disc 70 and disc 82 by locking rings 72 and 64, respectively, in the manner described hereinabove and illustrated in Fig. 1. An intermediate disc 84 is secured to the drum 44 by suitable means and is adapted to have inserted therein a series of hangers 86. An intermediate locking ring 88 locks the hangers 86 in place in the disc 84 but allows the hanger pivoting movement in the same manner as described hereinabove. The disc 82, which carries the lower prong elements of the hangers 60, is provided with additional holes to receive the lower prong elements of the hangers 86. The locking ring 64, which locks the hangers 60 in place in the disc 82, also locks the hangers 86 in place in the disc 82. Referring to Fig. 4, it is apparent that the hangers 86 are arranged so that they are spaced between the hangers 60 thereby providing adequate space for each hanger to carry a garment. The garment carrying portions of the hangers 86 are shown positioned below and extending beyond the garment carrying portions of the hangers 60. Thus, each indivdual hanger in the upper and lower hanger groups can be reached simply and without interfering with an adjacent hanger. By employing the additional hangers 86 and arranging them in spaced relation with respect to the hangers 60, twice the normal amount of garments may be displayed on the rack. The base assembly 10, which is adapted to receive the hanger assembly 80, as a unit, can amply carry the increased load due to the rigid construction of the triangularly arranged supporting members 12.

Referring now to Fig. 5, a modified form of the lower hanger locking means is illustrated. A lower disc member 90 is secured to the drum 44 by suitable means and has arranged near the outside edge thereof a series of openings 92 that extend through the disc 90. A hanger 94 is shaped in a manner such that the lower prong element 96 is adapted to extend through the opening 92. A speed or lock nut 98 is applied to securely lock the hanger 94 in place. By this locking arrangement, the lower locking rings can be eliminated.

Figure 6:
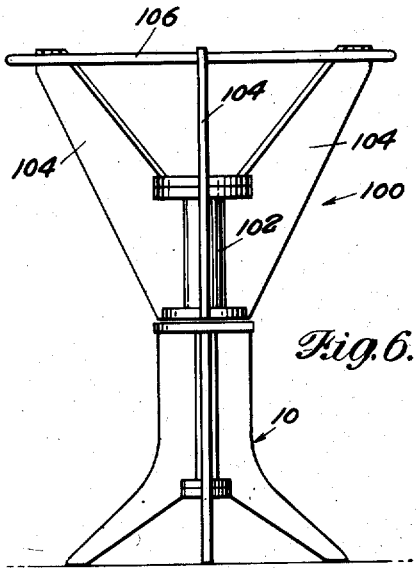
Fig. 6 is an elevational view of another modification of the present invention.

Due to the adaptability of the base assembly 10, it is also possible to replace the hanger assemblies with other display units. In order to effect the replacement, it is only necessary to remove the hanger assembly from engagement with the base assembly shaft and substitute a suitable unit constructed in a manner to be received by the base assembly shaft and associated bearing units. One example of a unit that can be carried by the base assembly 10 is shown in Fig. 6 in the form of a hang rod assembly. The hang rod assembly, generally indicated at 100, includes a cylinder 102 that is adapted to be rotatably carried by the shaft 30, and the frame members 104, which are secured to the cylinder 102 and extend generally upwardly. The frame members 102 carry a circular rod 106 at their top, which is secured in place by suitable means. It is apparent that a coat or suit or any garment hanging from a conventional hook hanger may be conveniently displayed by placing the hook hanger on the rod 106. The entire hang rod assembly 100 is rotatable around the stationary shaft 30, which provides for complete display of all the garments on the hang rod assembly. Other types of display assemblies can also be conveniently placed on the base assembly 10 and could take the form of a belt display assembly or a skirt display assembly.

It is apparent that the display racks illustrated and described are completely adaptable and can be employed for a variety of uses. Moreover, the racks are extremely rigid and capable of carrying excessive loads. Furthermore, a wide variety of garments to be displayed is possible because of the replaceable feature of the assemblies carried by the base unit.

The assemblies utilized to display the garments are rotatable which not only display the merchandise to its best advantage but allow great freedom of movement in inspecting or replacing the garments on the hanger units.

The hanger utilized with the hanger assemblies are securely held in place and are accessible for instant use.

Moreover, the pivoting action of the hangers and the rotating feature of the hanger assembly enable the displayed garments to be inspected with a minimum of effort.

Furthermore, the present display rack, in addition to having outstanding structural advantages, is unusually attractive in design. The modern design employed is not only neat and pleasing, but will display the garments on the rack to their full advantage and, moreover, will accent the appearance of the surrounding furnishings.

It will be obvious to those skilled in the art that various changes may be made without departing from the spirit of the invention and therefore the invention is not limited to what is shown in the drawings and described in the specification but only as indicated in the appended claims.

What is claimed is:

[1. In a garement display rack, a hanger assembly comprising a drum secured to a lower disc, said drum and lower disc rotatably mounted on a shaft, an upper disc secured to said drum, an intermediate disc secured to said drum located between said upper and lower discs, a first set of hangers having the ends thereof disposed in said upper and lower discs, and a second set of hangers having the ends thereof disposed in the intermediate and lower discs, each of the hangers in said second set of hangers being spaced between a pair of said first set of hangers.]

[2. In a garment display rack as set forth in claim 1, wherein an upper locking ring engages said upper disc, thereby securing the hanger ends of said first set of hangers therein, an intermediate locking ring engages said intermediate disc securing the hanger ends of said second set of hangers therein, and a lower locking ring engages said lower disc, thereby securing the ends of said first and second set of hangers therein.]

[3. In a garment display rack, a hanger assembly comprising an upper disc, a lower disc spaced from said upper disc, a structural member secured to said upper and lower discs and rotatably mounted on a shaft, an intermediate disc secured to said structural member and positioned between said upper and lower discs, a first set of hangers secured to said upper and lower discs, and a second set of hangers secured to said intermediate and lower discs, each of the hangers in the second set of hangers being spaced between a pair of the first set of hangers.]

*4. In a garment display rack, a hanger assembly rotatably mounted on a shaft, said hanger assembly comprising an upper disc, disc means spaced from said upper disc, structural means secured to said upper disc and disc means, an intermediate disc secured to said structural means and positioned between said upper disc and disc means, a first set of hangers pivotally secured to said upper disc and disc means on an axis parallel to said structural means, and a second set of hangers secured to said intermediate disc and disc means and mounted for pivotal movement independent of said first set of hangers on an axis parallel to said structural means, each of the hangers in the second set of hangers being equally spaced between a pair of said hangers in the first set of hangers.*

*5. In a garment display rack, a hanger assembly rotatably mounted on a shaft, said hanger assembly comprising structural means, a first set of hangers radiating outwardly with respect to said structural means, a second set of hangers radiating outwardly with respect to said structural means, and projecting beyond said first set of hangers, each of said hangers of said first and second sets being independently mounted for pivotal movement on an axis parallel to said structural means, each of said first and second sets of hangers including an upper arm and an inclined arm, disc means mounted on the uppermost end of said structural means and receiving the ends of the upper arms of said first set of hangers, intermediate disc means secured to said structural means between upper and lower ends thereof, said intermediate disc means receiving the ends of the upper arms of said second set of hangers, and means secured to the lower portion of said structural means receiving the ends of the inclined arms of said first and second sets of hangers.*

*6. In a garment display rack as set forth in claim 5 wherein each of the hangers of said first set of hangers is positioned between a pair of immediately adjacent hangers of said second set.*

*7. In a garment display rack, a hanger assembly comprising structural means, a first set of hangers radiating outwardly with respect to said structural means, a second set of hangers radiating outwardly with respect to said structural means, each of said hangers of said first and second sets being independently mounted for pivotal movement on an axis substantially parallel to said structural means, each of said first and second sets of hangers including an upper arm and a lower arm, disc means mounted on the uppermost end of said structural means and receiving the ends of the upper arms of said first set of hangers, intermediate disc means secured to said structural means between the upper and lower ends thereof, said intermediate disc means receiving the ends of the upper arms of said second set of hangers, means secured to the lower portion of said structural means receiving the ends of said lower arms of said first and second sets of hangers, each of the hangers of said first set of hangers being positioned between a pair of hangers of said second set of hangers.*

References Cited in the file of this patent or the original patent

UNITED STATES PATENTS

| | | |
|---|---|---|
| 131,696 | Mathewson | Sept. 24, 1872 |
| 318,252 | Holmes | May 19, 1885 |
| 339,678 | Morlan | Apr. 13, 1886 |
| 353,435 | Allen | Nov. 30, 1886 |
| 567,507 | Raymond | Sept. 8, 1896 |
| 610,163 | Best | Sept. 6, 1898 |
| 632,999 | Grant | Sept. 12, 1899 |
| 752,151 | Gies | Feb. 16, 1904 |
| 824,083 | Roach | June 19, 1906 |
| 983,439 | Harr | Feb. 7, 1911 |
| 999,189 | Altvater | July 25, 1911 |
| 1,139,273 | Griffin | May 11, 1915 |
| 1,695,322 | Day | Dec. 18, 1928 |
| 1,711,587 | Brunhoff | May 7, 1929 |
| 1,740,118 | Rand | Dec. 17, 1929 |
| 1,770,227 | Buckingham | July 8, 1930 |
| 2,119,946 | Bancroft | June 7, 1938 |
| 2,129,426 | Jenks | Sept. 6, 1938 |
| 2,282,836 | Vanderveld | May 12, 1942 |
| 2,477,086 | Riffert | July 26, 1949 |

FOREIGN PATENTS

| | | |
|---|---|---|
| 662,329 | Great Britain | Dec. 5, 1951 |